US009827924B2

(12) United States Patent
Rockwell et al.

(10) Patent No.: US 9,827,924 B2
(45) Date of Patent: Nov. 28, 2017

(54) METHODS AND SYSTEMS FOR LOSS OF COMMUNICATION DETECTION IN A VEHICLE NETWORK

(71) Applicant: Ford Global Technologies, LLC, Dearborn, MI (US)

(72) Inventors: Mark Anthony Rockwell, Wyandotte, MI (US); Dennis Seung-Man Yang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 14 days.

(21) Appl. No.: 14/601,900

(22) Filed: Jan. 21, 2015

(65) Prior Publication Data

US 2016/0207479 A1    Jul. 21, 2016

(51) Int. Cl.
| | |
|---|---|
| *G01M 17/00* | (2006.01) |
| *G06F 7/00* | (2006.01) |
| *G06F 19/00* | (2011.01) |
| *B60R 16/023* | (2006.01) |
| *G07C 5/00* | (2006.01) |
| *G07C 5/08* | (2006.01) |

(52) U.S. Cl.
CPC .............. *B60R 16/023* (2013.01); *G07C 5/00* (2013.01); *G07C 5/0816* (2013.01)

(58) Field of Classification Search
CPC .................................................... B60R 16/023
See application file for complete search history.

(56) References Cited

U.S. PATENT DOCUMENTS

| | | | |
|---|---|---|---|
| 2005/0171721 A1* | 8/2005 | Patterson .......... | B60W 50/0205 702/122 |
| 2011/0035180 A1* | 2/2011 | Jin .......................... | H04L 12/66 702/122 |
| 2014/0277828 A1 | 9/2014 | Bullister et al. | |
| 2015/0286198 A1* | 10/2015 | Sugeno ..................... | G06F 1/26 700/295 |

FOREIGN PATENT DOCUMENTS

WO    2014039031 A1    3/2014

* cited by examiner

*Primary Examiner* — Imran Mustafa
(74) *Attorney, Agent, or Firm* — Julia Voutyras; McCoy Russell LLP

(57) ABSTRACT

Methods and systems are provided for detecting loss of communication in a vehicle network. In one example, a method may include determining a diagnostic time threshold based on an estimated duration for failure of vehicle operation under current operating conditions due to a loss of communication with a control module in the vehicle network. Further, in response to a duration of loss of communication exceeding the time threshold, a loss of communication DTC may be activated.

13 Claims, 7 Drawing Sheets

METHODS AND SYSTEMS FOR LOSS OF COMMUNICATION DETECTION IN A VEHICLE NETWORK

FIELD

The present description relates generally to methods and systems for detecting loss of communication in a vehicle network.

BACKGROUND/SUMMARY

Vehicle systems may be equipped with a plurality of vehicle control modules that receive information from vehicle electronic sensing devices and communicate regulatory information to actuators. Further, vehicle systems may be configured with vehicle data networks for data exchange and communication among the vehicle control modules, and between the vehicle control modules and associated sensors and actuators.

One example of vehicle data network is a controller area network (CAN), which is a shared serial bus system connecting the various vehicle control modules. When there is a loss of communication between the modules, information may be unavailable for arbitration and execution of vehicle actions. Therefore, vehicle systems may include an on-board diagnostic (OBD) system for monitoring vehicle operations, as well as for monitoring the vehicle network and diagnosing faults in network communication. Upon detecting loss of communication from a control module for a predetermined duration threshold (e.g., 5 seconds), the OBD system may activate a diagnostic trouble code (DTC) corresponding to the nature of fault detected.

However, the inventors herein have identified potential issues with such an approach. For example, by utilizing the predetermined duration threshold, loss of communication in the network may result in a failure in vehicle operation (due to loss of information for execution of vehicle operation) prior to the activation of a loss of communication DTC. As a result, the vehicle may enter a failure mode before the loss of communication DTC is set. Consequently, the loss of communication may not be detected leading to difficulty in diagnosing the actual cause of vehicle failure, and causing delays in problem solving. As an example, when there is a loss of communication from a fuel pump electronics module (PEM), the vehicle may stall due to lack of torque before the OBD system activates a loss of communication DTC for PEM (e.g., a U0109 code).

In one example, some of the above issues may be at least partly addressed by a method for a vehicle, comprising: determining a first time threshold for a setting a loss of communication diagnostic trouble code based on an estimated duration for loss of vehicle operation due to a loss of communication from a first module connected to a vehicle network connecting a plurality of control modules in the vehicle.

As an example, a plurality of control modules regulating one or more vehicle operations may be connected via one or more vehicular network bus for data exchange and communication. Communication from the control modules may be monitored and upon detecting a loss of communication from a control module, an estimated duration for failure of vehicle operation due to the loss of communication may be determined. Further, a time threshold for activating a loss of communication DTC may be determined based on the estimated duration for failure so as to activate the loss of communication DTC prior to occurrence of vehicle failure due to the loss of communication.

In this way, intelligent decisions for setting loss of communication DTCs may be executed by adjusting the time threshold for setting the loss of communication DTC based on the estimated duration for vehicle operation failure. As a result, loss of communication faults may be detected prior to the vehicle entering a failure mode, thereby improving loss of communication diagnosis and enabling faster problem solving.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
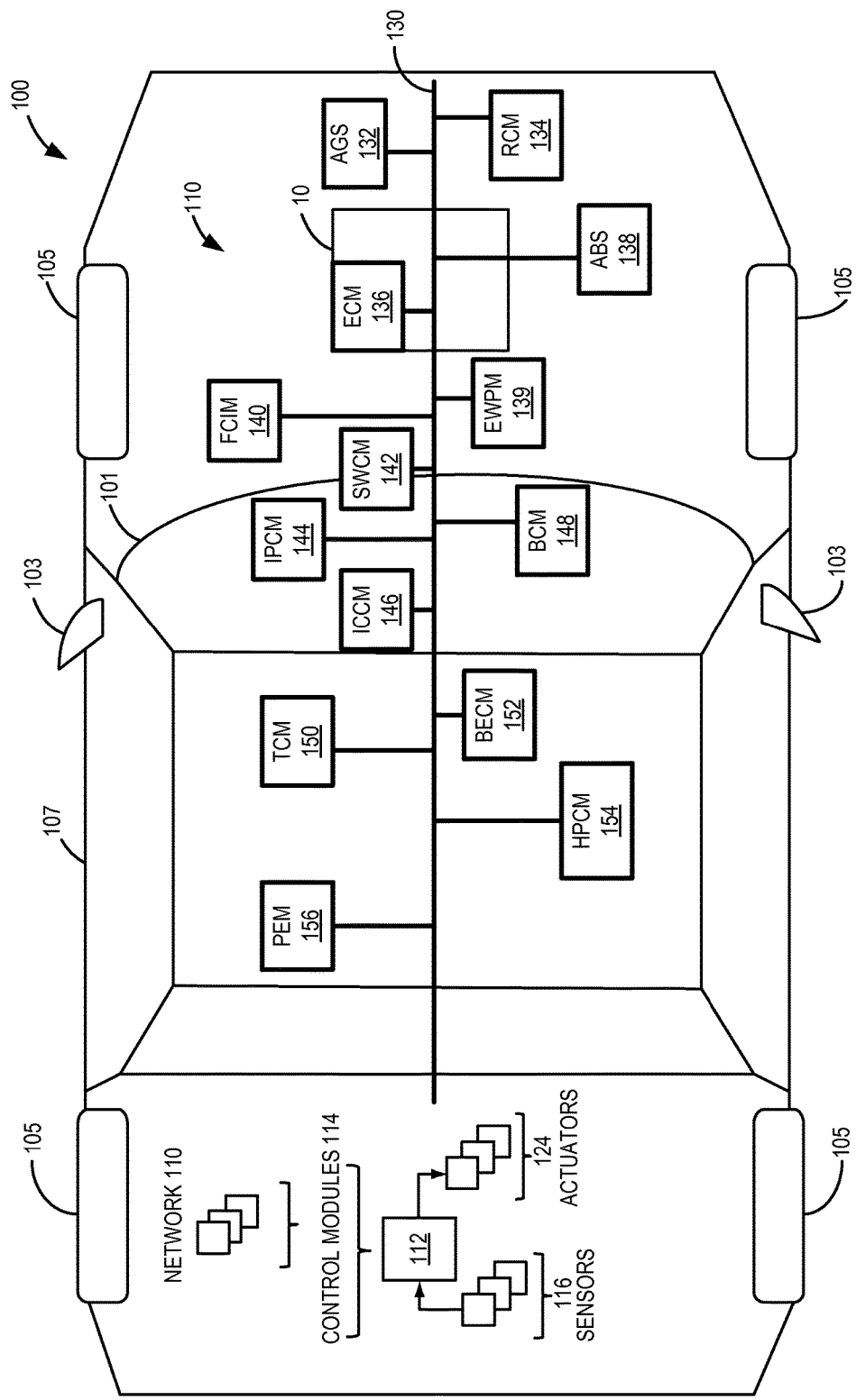
FIG. 1 is a block diagram showing architecture of a vehicle control system including one or more modules communicating with a vehicular network bus.
Figure 2:
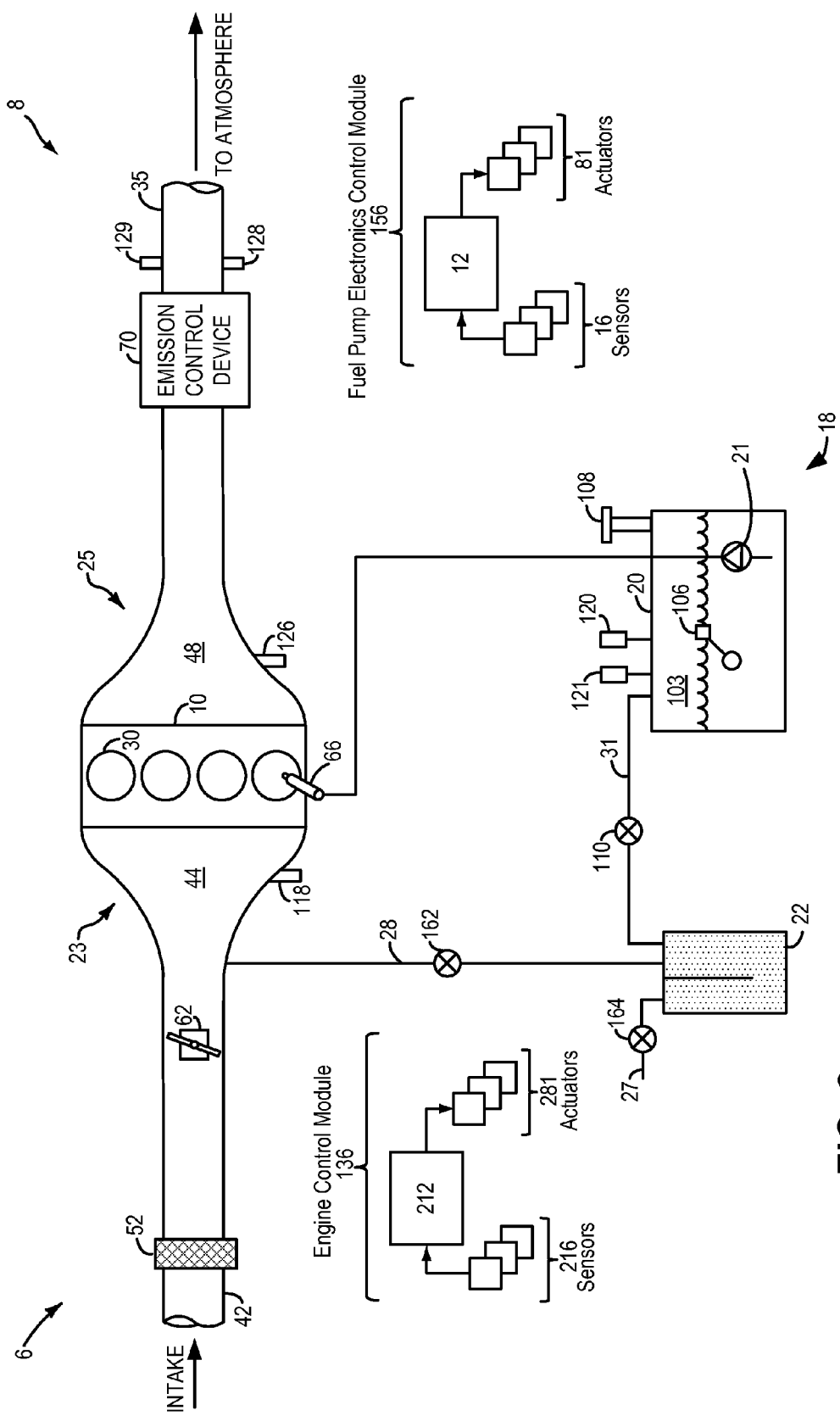
FIG. 2 shows a schematic diagram of an engine system including an engine control module and a fuel system including a fuel pump electronics control module, the ECM and the PEM included in the vehicle control system of FIG. 1.

The following description relates to systems and methods for loss of communication in a vehicle network such as the vehicle network shown in FIG. 1 including an engine system and a fuel system of FIG. 2. One or more controllers in the vehicle network may be configured to perform a control routine, such as routine of FIG. 3 to set a diagnostic time code in response to detecting loss of communication from one or more modules in the network according to the routines of FIGS. 4A-4B. Further, a diagnostic time threshold for setting the diagnostic time code may be determined based on the routine of FIG. 5. An example setting of the loss of communication diagnostic time code according to the present disclosure is shown at FIG. 6.

Turning to FIG. 1, an example embodiment of motor vehicle 102 equipped with a vehicle network system 110 connecting a plurality of control modules 114 is illustrated schematically. Motor vehicle 102 may be a road automobile, among other types of vehicles. Vehicle 102 includes drive wheels 105, a windshield 101, side view mirrors 103, and an internal combustion engine 10. Internal combustion engine 10 includes a combustion chamber (not shown) which may receive intake air via an intake passage (not shown) and may exhaust combustion gases via exhaust passage (not shown).

Motor vehicle 102 further includes vehicle network system 110 including plurality of control modules 114 communicating via a network bus 130 and regulating various vehicle operations. A bus communication may include a controller area network allowing flexible network configurations based on different types of microprocessors and microcontroller. The plurality of control modules 114 may include but are not limited to active grille shutter module (AGS) 132, restraints control module (RCM) 134, engine control module (ECM) 136, anti-lock brake system module (ABS) 138, engine coolant pump control module (EWPM) 139, heating-ventilation-air conditioning control module (FCIM) 140, steering column control module (SWCM) 142, instrument panel cluster control module (IPCM) 144, cruise control module (ICCM) 146, body control module (BCM) 148, transmission control module (TCM) 150, battery energy control module (BECM) 152, hybrid powertrain control module (HPCM) 154, and fuel pump electronics control module (PEM) 156. The network bus may operate utilizing one or more communication protocols such as a controller area network (CAN) protocol, or a fiber optic media oriented systems transport ring (MOST) protocol. The modules may communicate in a peer-to-peer configuration. Alternatively, a master-slave configuration may be utilized.

In the given example, one network communication bus 130 is shown. However, it must be appreciated that the network communication bus may further communicate with one or more additional communication bus each including one or more additional control modules.

Each of the control modules 114 may be communicatively coupled to various components of vehicle 100 including engine 10 to carry out the control routines and actions described herein. Further, each of the control modules 114 connected to network bus 130 may include its own electronic digital controller 112. Controller 112 may be a microcomputer, including a microprocessor unit, input/output ports, an electronic storage medium for executable programs and calibration values, random access memory, keep alive memory, and a data bus.

As depicted, each controller 112 included in each control module may receive input from a plurality of sensors 116, which may include one or more of user inputs and/or sensors (such as barometric pressure, transmission gear position, transmission clutch position, gas pedal input, brake input, transmission selector position, vehicle speed, engine speed, mass airflow through the engine, ambient temperature, intake air temperature, etc.), climate control system sensors (such as coolant temperature, adsorbent temperature, fan speed, passenger compartment temperature, desired passenger compartment temperature, ambient humidity, etc.), and others.

Further, controller 112 may communicate with various actuators 124, which may include one or more of engine actuators (such as fuel injectors, an electronically controlled intake air throttle plate, spark plugs, transmission clutches, etc.), climate control system actuators (such as air handling vents and/or diverter valves, valves controlling the flow of coolant, blower actuators, fan actuators, etc.), and others. In addition, controller 112 may receive data from a global positioning system and/or an in-vehicle communications and entertainment system of vehicle 100.

Further, the vehicle network 110 may be communicatively coupled to an off-board network (not shown) such as a cloud computing system via wireless communication, which may be Wi-Fi, Bluetooth, a type of cellular service, or a wireless data transfer protocol.

Further, the vehicle network 110 may include a diagnostic module for monitoring communication from each of the control modules 114 in the network, detecting loss of communication from the control modules, and setting DTCs (e.g. loss of communication DTCs). In some examples, additionally or alternatively, each of the control modules may include a secondary control module for monitoring communication, detecting loss of communication from the control modules, and setting DTCs. Example control routines for monitoring communication from the modules, detecting loss of communication from the modules, and setting loss of communication DTCs may be stored in a diagnostic controller of the diagnostic module and/or in a secondary controller the secondary module and will be further elaborated with respect to FIGS. 3-5.

As such, during certain engine operating conditions, there may be loss of communication from one or more control modules in the network. Consequently, information may be unavailable for arbitration and execution of associated vehicle actions which may lead to failure in vehicle operation. Further, the failure may occur prior to activation of a loss of communication DTC. Therefore, in order to activate the loss of communication DTC prior to failure of vehicle operation, a diagnostic time threshold (that is, minimum duration of loss of communication after which loss of communication DTC may be set) for setting loss of communication DTC may be based on an estimated duration for failure due to the loss of communication. For example, the diagnostic time threshold for setting loss of communication DTC may be less than the estimated duration for failure. Details of determining the diagnostic time threshold and setting the loss of communication DTC will be further elaborated with respect to FIGS. 3-6.

In one example, the system of FIG. 1 provides for a vehicle system, comprising: a plurality of electronic control modules regulating a plurality of vehicle operations, each of the plurality of control modules communicating with a controller area network bus of a vehicle control system; a monitor line communicating diagnostic data between a first control module and an electronic control module of the plurality of control modules; a controller with computer readable instructions stored in non-transitory memory for: detecting a loss of communication from the first module based on detecting an error state of the monitor line; in response to detecting the loss of communication, adjusting a first time constant based on an estimated time for vehicle failure to occur due to a loss of communication from a first module; and wherein the loss of communication is determined based on an error state of the monitor line.

The system further includes wherein adjusting the first time constant includes reducing the time constant to less than the estimated time; and wherein the controller includes further instructions for setting a loss of communication diagnostic time code in response to a counter exceeding the adjusted time constant, and shifting vehicle operation to a failure mode in response to setting the loss of communication diagnostic code; and wherein the counter is started in response to detecting the loss of communication from the first module via the monitor line.

FIG. 2 shows a schematic depiction of a hybrid vehicle system 6 that can derive propulsion power from engine system 8 and/or an on-board energy storage device, such as a battery system (not shown). An energy conversion device, such as a generator (not shown), may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Engine system 8 is coupled to a fuel system 18. Fuel system 18 includes a fuel tank 20 coupled to a fuel pump 21 and a fuel vapor canister 22. During a fuel tank refueling event, fuel may be pumped into the vehicle from an external source through refueling door 108. Fuel tank 20 may hold a plurality of fuel blends, including fuel with a range of alcohol concentrations, such as various gasoline-ethanol blends, including E10, E85, gasoline, etc., and combinations thereof. A fuel level sensor 106 located in fuel tank 20 may provide an indication of the fuel level to controller 12. As depicted, fuel level sensor 106 may comprise a float connected to a variable resistor. Alternatively, other types of fuel level sensors may be used.

Fuel pump 21 is configured to pressurize fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, via conduit 31, before being purged to the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23 by opening canister purge valve 162. While a single canister 22 is shown, it will be appreciated that fuel system 18 may include any number of canisters. In one example, canister purge valve 162 may be a solenoid valve wherein opening or closing of the valve is performed via actuation of a canister purge solenoid.

Canister 22 includes a vent 27 for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23 via purge line 28 and purge valve 162. While this example shows vent 27 communicating with fresh, unheated air, various modifications may also be used. Vent 27 may include a canister vent valve 164 to adjust a flow of air and vapors between canister 22 and the atmosphere. In one example, canister vent valve 164 may be a solenoid valve wherein opening or closing of the valve is performed via actuation of a canister vent solenoid.

One or more pressure sensors 120 may be coupled to fuel system 18 for providing an estimate of a fuel system pressure. One or more temperature sensors 121 may also be coupled to fuel system 18 for providing an estimate of a fuel system temperature.

Fuel system 18 may be operated by fuel pump electronics control module (PEM) 156 including a controller 12 receiving information from a plurality of sensors 16 included in the fuel system and sending control signals to a plurality of actuators 81 included in fuel system 18. For example, the fuel system may be operated in an injection mode, wherein the controller 12 may activate fuel pump for providing a desired amount of fuel to a fuel rail for combustion.

Likewise, engine system 8 may be controlled at least partially by an engine control module (ECM) 136 including controller 212 receiving information from a plurality of sensors 216 (various examples of which are described herein) and sending control signals to a plurality of actuators 281. As one example, sensors 16 may include TIP sensor, a humidity sensor, MAP sensor, and MCT sensor. As another example, actuators 81 may include fuel injector 66, and intake throttle 62. Other actuators, such as a variety of additional valves and throttles, may be coupled to various locations in engine system 8. Controller 212 may receive input data from the various sensors, process the input data, and trigger the actuators in response to the processed input data based on instruction or code programmed therein corresponding to one or more routines.

Further, in some examples, PEM 156 and ECM 136 may each include a secondary diagnosis module for monitoring communication and detecting loss of communication from the PEM. Additionally or alternatively, communication monitoring and diagnosis from the PEM or ECM may be monitored by a diagnosis module (not shown) linked to a vehicle network (such as vehicle network 110 in FIG. 1). In some other examples, ECM may monitor communication from the PEM via a monitor line (not shown) linking the PEM and the ECM.

In one example, a loss of communication from the PEM may be detected. In response to the loss of communication, an estimated duration for vehicle failure under current operating conditions (in this example, the estimated duration before the vehicle stalls due to loss of torque resulting from loss of communication with the PEM) may be determined. Further, a diagnostic time threshold for setting loss of communication DTC may be determined based on the estimated duration for failure under current vehicle operating conditions. Upon a counter (that may be started in response to detecting the loss of communication) reaching the diagnostic time threshold, loss of communication DTC may be set. For example, the diagnostic time threshold may be less than the estimated duration for failure. In this way, loss of communication DTC may be set before the vehicle operation fails. As an example, if loss of communication from the PEM may stall the vehicle in 3 seconds at 70 miles per hour, then the diagnostic time threshold may be set to a value less than 3 seconds so as to activate the loss of communication DTC for PEM before the vehicle stalls.

Figure 3:
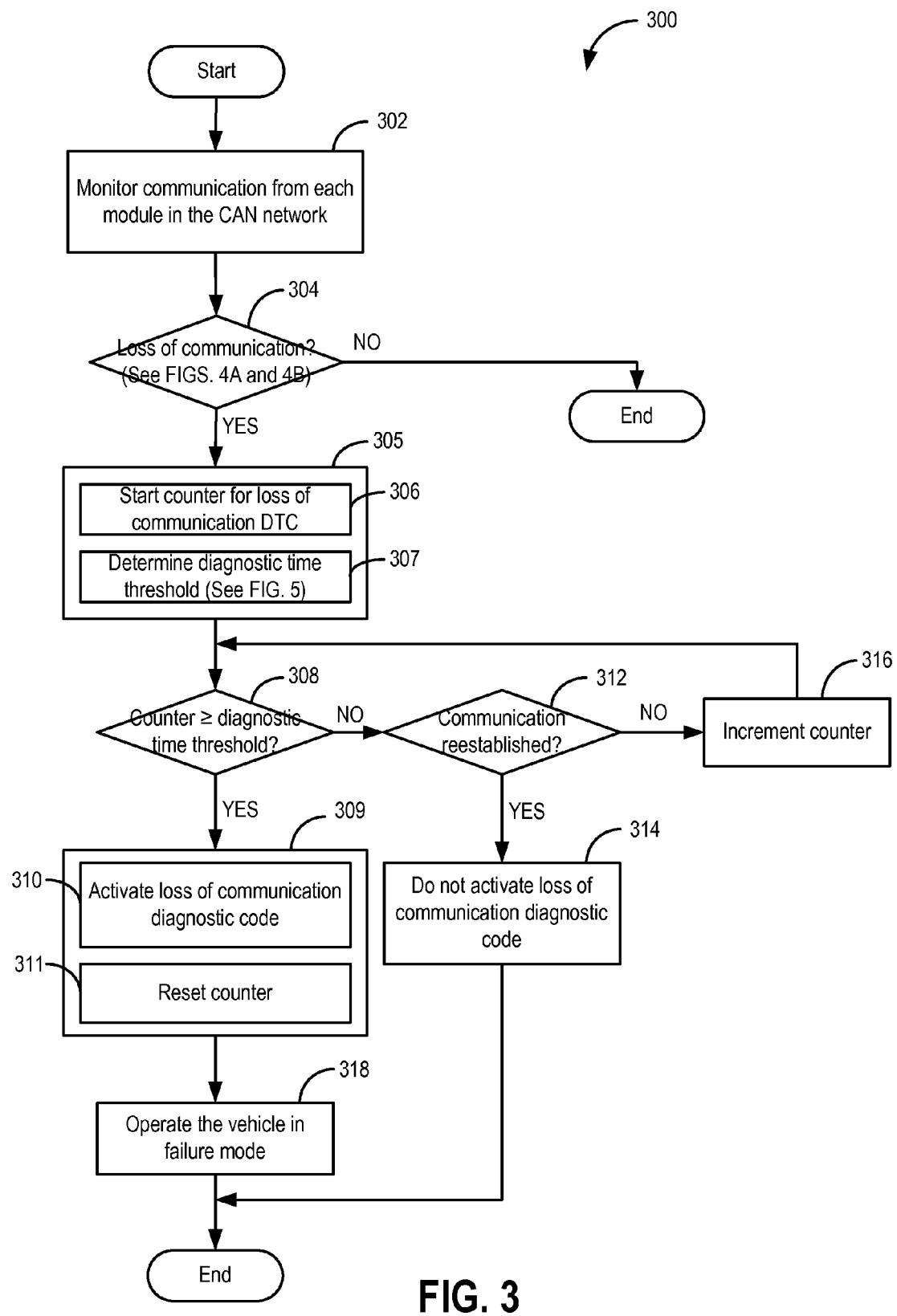
FIG. 3 is a high level flow chart illustrating an example method for setting a loss of communication diagnostic code.

Turning to FIG. 3, an example method 300 for setting a diagnostic code for loss of communication in a vehicle control system including a plurality of modules linked (e.g. control modules 114 shown in FIG. 1) to a vehicle data network (e.g. network 110 shown in FIG. 1). The method of FIG. 3 may be stored as executable instructions in non-transitory memory of each controller (e.g. controller 112 shown in FIG. 1) and carried out by the controller in combination with the various sensors, actuators, and engine and vehicle components illustrated in FIGS. 1-2. Additionally or alternatively, the method of FIG. 3 may be stored as executable instructions in non-transitory memory of a diagnostic controller included in a diagnostic module linked to a vehicle network (e.g. network 110 in FIG. 1).

At 302, method 300 includes monitoring data from each of the plurality of modules in the vehicle network. In one example, a diagnostic module linked to the vehicle network may monitor one or more expected signals from each of the plurality of modules in the network. The expected signal may be transmitted from each of the plurality of modules in a predetermined format including a start of frame, an identifier, remote transmission request bit or substitute remote request bit, identifier extension, reserve bit, data length code, data, cyclic redundancy check, acknowledgement bit, end of frame, inter frame space, etc. In another example, the diagnostic module may monitor data in one or more monitor lines, each monitor line linking a module with the ECM. In still another example, the ECM may monitor the monitor line from each of the modules linked to the ECM via the monitor line(s). As such, the diagnostic module may be a centralized diagnostic module monitoring data from each of the plurality of the modules. In some examples, each module may include a secondary diagnostic module for monitoring data and diagnosing loss of communication. In some other examples, a hybrid approach may be utilized, wherein during some conditions, the centralized diagnostic module may be utilized and during some other conditions, the secondary diagnostic module(s) may be utilized. In yet another example, the centralized diagnostic module may be utilized to monitor signals from one or more groups of modules, each group including a number of individual modules comprising secondary diagnostic modules.

Next, at 304, method 300 includes determining if loss of communication from any of the plurality of the modules is detected. Example methods for detecting loss of communication are further elaborated at FIGS. 4A-4B. In one example, loss of communication may be detected based on absence of the one or more expected signal for a first duration greater than a first threshold duration. In another example, loss of communication may be determined based on an error state of the monitor line(s) linking one or more modules to the ECM for a second duration greater than a second threshold duration. As such, the first and the second duration may be greater than a minimum duration, wherein the minimum duration may be the duration of reduced or dropped data activity, for example, during one or more of a vehicle power up mode, a module cycling operation through modes, and high vehicular network activity. If the answer at 304 is YES, then loss of communication is detected and accordingly, method 300 proceeds to 305. If the answer at 304 is NO, then loss of communication is not detected and accordingly, method 300 returns.

At 305, method 300 includes starting a counter (306) for activating loss of communication diagnostic trouble code (DTC). Further, a diagnostic time threshold (307) for activating the loss of communication DTC may be determined. The diagnostic time threshold may be based on an estimated duration for failure under given vehicle operating conditions due to loss of communication. Details of determining the diagnostic time threshold will be further elaborated at FIG. 5.

Next, at 308, method 300 includes determining if a value of the counter is greater than or equal to the diagnostic time threshold. If the answer is YES, then the detected loss of communication may impact the performance of the vehicle (e.g., engine cooling, climate control, drivability, etc.), and accordingly method 300 proceeds to 309. At 309, method 300 includes activating the diagnostic time code (310) for loss of communication for the module from which loss of communication was detected. Further, method 300 includes resetting the counter (311). For example, upon detecting loss of communication from a fuel pump control module (PEM), and upon determining that the counter has reached the diagnostic time threshold, a U0109 DTC may be activated indicating lost communication with the fuel pump control module. Likewise, if loss of communication from a hybrid powertrain control module is detected and the counter reaches or exceeds the diagnostic time threshold, a U0293 DTC for lost communication with the hybrid powertrain control module may be activated. As such, the DTC may be readable by a universal diagnostic code reader of a kind known in the art. Further, in some examples, the loss of communication may be indicated to a vehicle operator. In one example, the indicator may be visual, e.g., an illuminated signal on a dashboard of the vehicle. In another example, the indicator may be audible.

Next, upon activating the loss of communication DTC, method 300 may proceed to 318. At 318, method 300 may include operating the vehicle in a failure mode.

Returning to 308, if the counter is less than the diagnostic time threshold, method 300 may proceed to 312. At 312, method 300 includes determining if communication with the module is reestablished. For example, it may be determined that communication with the module is reestablished based on detecting the expected signal(s) from the module. In another example, it may be determined that communication with the module is reestablished based on the monitor line returning to a functional state from the error state. If the answer at 312 is YES, communication with the module is reestablished and accordingly, the loss of communication DTC may not be activated. If the answer at 312 is NO, the expected signal from the module is not detected and/or the monitor line remains in an error state. Therefore, upon not detecting normal communication from the module, method 300 may proceed to 316. At 316, the counter may be incremented. Upon incrementing the counter, method 300 may return to 308 to determine is the counter has reached or exceeded the diagnostic time threshold.

In this way, in response to detecting loss of communication, the loss of communication DTC may be activated such that the DTC is set prior to the vehicle entering a failure mode due to loss of communication from one or more control modules.

In one example, the method of FIG. 3 provides for a method for a vehicle, comprising: determining a first time threshold for a setting a loss of communication diagnostic trouble code based on an estimated duration for failure due to a loss of communication from a first control module connected to a vehicle network connecting a plurality of control modules in the vehicle. The method further includes in response to a counter exceeding the first time threshold, setting the loss of communication diagnostic trouble code, wherein the counter is started in response to determining the loss of communication from the first module.

The method further includes wherein the time threshold is less than the estimated duration for failure, and wherein the estimated duration of failure is based on one or more of a vehicle speed, a vehicle load condition, barometric pressure, and an operating condition of one or more vehicle components communicating with the first module at a time of detecting the loss of communication.

The method further includes wherein determining the loss of communication includes not detecting one or more expected signals from the first module, and wherein determining the loss of communication includes determining an error state of a monitor line communicating data between the first module and an engine control module (ECM) of the vehicle; and wherein the error state is determined based on the ECM not receiving data from the first module via the monitor line.

Further, the method comprises operating the vehicle in a failure mode in response to detecting the failure due to the loss of communication, and the method further includes wherein the loss of communication diagnostic trouble code is set prior to entering the failure mode.

Figure 4A:
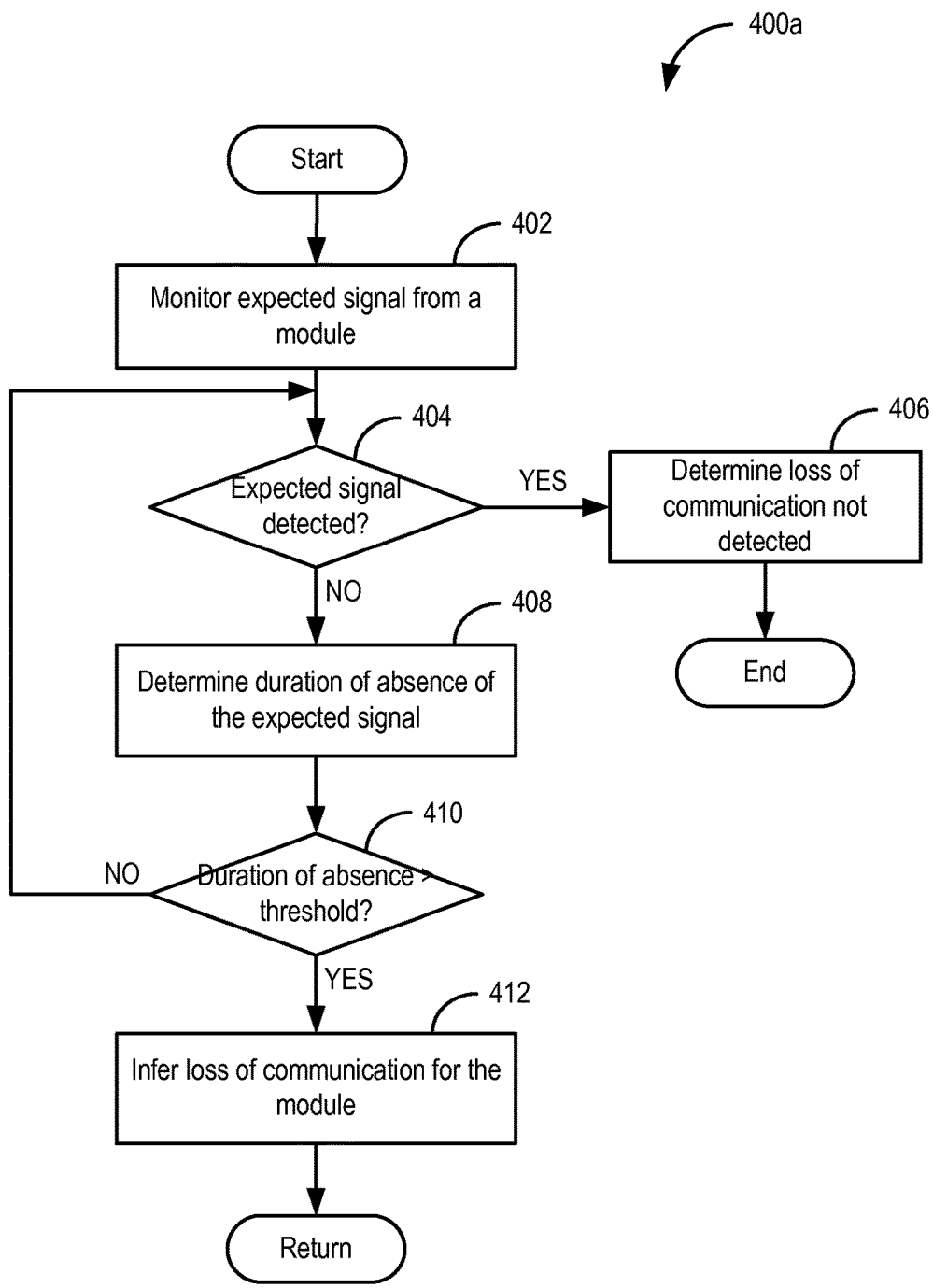
FIG. 4A is a high level flow chart illustrating a first example method for determining loss of communication for a module in the vehicle control system.

Turning to FIG. 4A, an example method 400a for detecting loss of communication from a control module linked to a vehicle network (e.g. network 110 shown in FIG. 1). As such, the control module may regulate one or more vehicle operations in a vehicle system including the vehicle network. The method of FIG. 4 may be stored as executable instructions in non-transitory memory of a controller (e.g. controller 112 shown in FIG. 1) and carried out by the controller in combination with the various sensors, actuators, engine and vehicle components illustrated in FIGS. 1-2. Additionally or alternatively, the method of FIG. 3 may be stored as executable instructions in non-transitory memory of a diagnostic controller included in a diagnostic module linked to a vehicle network (e.g. network 110 in FIG. 1).

At 402, method 400 includes monitoring one or more expected signals from the control module. For example, a diagnostic module linked to the vehicle network may monitor the expected signal(s) from each module connected to the network. In some examples, a secondary module included in the control module may monitor the expected signal(s) from the control module. In some other examples, the expected signal(s) may be monitored by the diagnostic module and the secondary module. In still other examples, expected signal(s) from one or more control modules in the network may be monitored by the diagnostic module while the expected signal(s) from the remaining modules (that is, the modules that are not monitored by the diagnostic module) may be monitored by a secondary module included in each of the remaining modules. The expected signal may be transmitted from each of the plurality of modules in a predetermined format including a start of frame, an identifier, remote transmission request bit or substitute remote request bit, identifier extension, reserve bit, data length code, data, cyclic redundancy check, acknowledgement bit, end of frame, inter frame space, etc. Next at 404, method 400 includes determining if the expected signal is detected. For example, the expected signal transmitted over the vehicle network may be detected by a module (such as the diagnostic module, the secondary module, ECM etc) monitoring the signal. If the answer is YES, method 400 may proceed to 406 to determine loss of communication not detected. If the answer at 404 is NO, then the expected signal is not detected and method 400 may proceed to 408. At 408, method 400 includes determining a duration of absence of the expected signal. In one example, a second counter may be started or incremented in response to not detecting the expected signal. The duration of absence of the expected signal may be determined based on the counter value.

Upon determining the duration of absence of the expected signal, method 400 may proceed to 410. At 410, method 400 may determine if the duration of absence is greater than a second threshold duration. If the answer at 410 is YES, method 400 may proceed to 412. If the answer at 410 is NO, method 400 returns to step 404. At 412, upon confirming that the duration of absence is greater than the second threshold duration, method 400 may infer loss of communication from the module. That is, upon confirming that the expected signal loss has occurred for a duration greater than the second threshold, method 400 may determine that the control module has lost communication with the vehicle network.

Figure 4B:
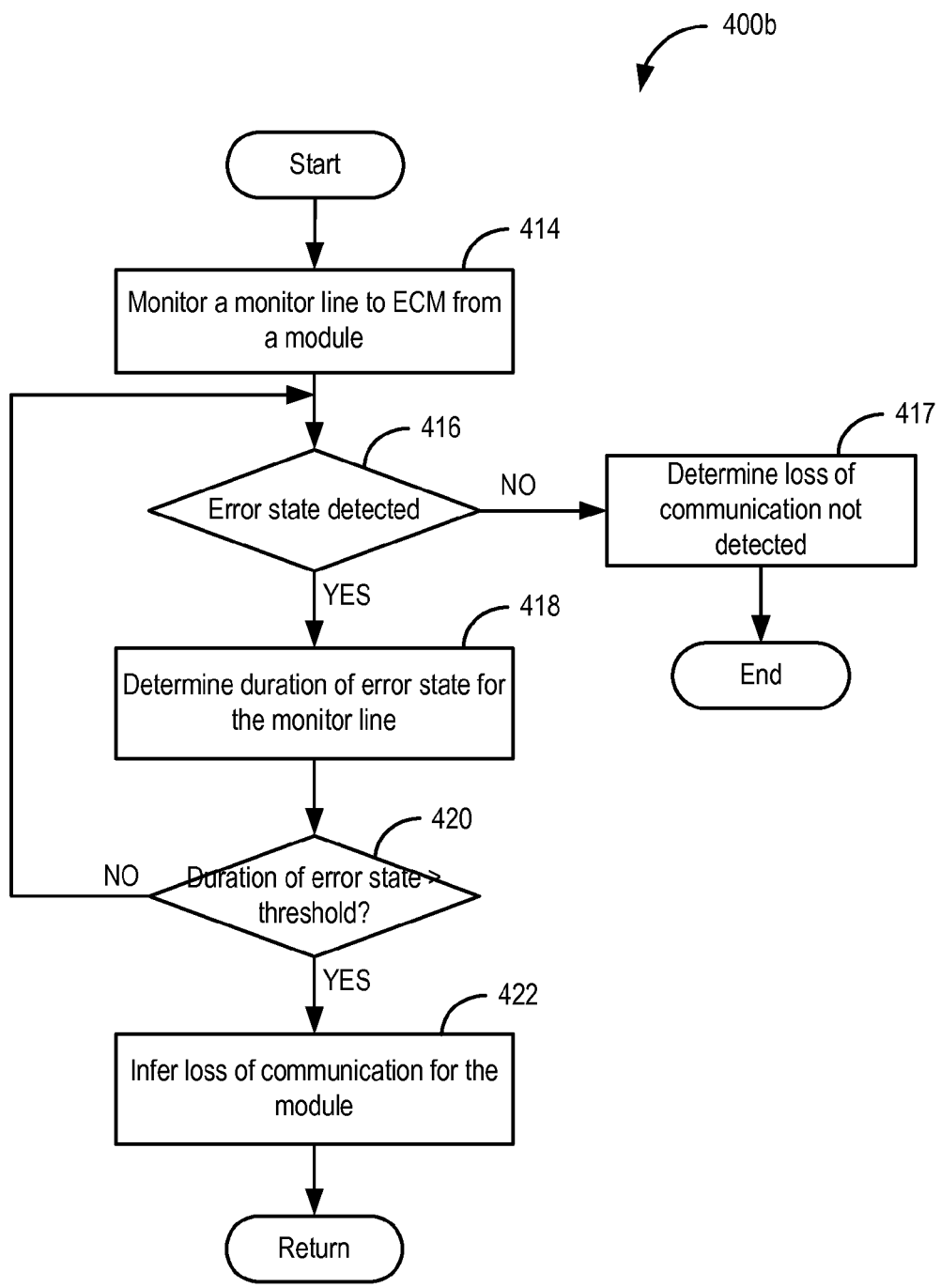
FIG. 4B is a high level flow chart illustrating a second example method for determining loss of communication for a module in the vehicle control system.

Turning to FIG. 4B, an example method 400b for detecting loss of communication from a control module linked to a vehicle network (e.g. network 110 shown in FIG. 1). As such, the control module may regulate one or more vehicle operations in a vehicle system including the vehicle network. The method of FIG. 4 may be stored as executable instructions in non-transitory memory of a controller (e.g. controller 112 shown in FIG. 1) and carried out by the controller in combination with the various sensors, actuators, engine and vehicle components illustrated in FIGS. 1-2. Additionally or alternatively, the method of FIG. 3 may be stored as executable instructions in non-transitory memory of a diagnostic controller included in a diagnostic module linked to a vehicle network (e.g. network 110 in FIG. 1).

At 414, method 400 includes monitoring a monitor line connecting the control module with the ECM. The monitor line may include diagnostic data for determining functional communication from the control module. In one example, the monitor line may be monitored by a diagnostic module linked to the vehicle network. In another example, a secondary module included in the control module may monitor the monitor line. In still another example, the ECM may monitor the monitor line. In some other examples, the monitor line may be monitored by a combination of two or more of the diagnostic module, the secondary module, and the ECM. In still other examples, one or more control modules in the network may be monitored by the diagnostic module while the remaining modules (that is, the modules that are not monitored by the diagnostic module) may be monitored by a secondary module included in each of the remaining modules and/or the ECM.

Next at 416, method 400 includes determining if an error state of the monitor line is detected. For example, the error state may be detected by a module (such as the diagnostic module, the secondary module, ECM, etc.) monitoring the signal. Further, the error state may be determined based on absence of one or more signals in the monitor line. In some examples, the error state may be determined based on presence of truncated or altered signal in the monitor line. If the answer is NO, method 400 may proceed to 417 to determine loss of communication not detected. If the answer at 404 is YES, then the monitor line is operating in an error state and accordingly, method 400 may proceed to 418. At 418, method 400 includes determining a duration of error state. In one example, an error state counter may be started or incremented in response to determining operation of the monitor line in the error state. The duration of error state may be determined based on the counter value.

Upon determining the duration of error state of the monitor line, method 400 may proceed to 420. At 420, method 400 may determine if the duration of error state is greater than an error state threshold duration. If the answer at 420 is YES, method 400 may proceed to 422. If the answer at 420 is NO, method 400 returns to step 416. At 420, upon confirming that the duration of error state is greater than the error state threshold duration, method 400 may infer loss of communication from the module. That is, upon confirming that the monitor line has remained in the error state for a duration greater than the error state threshold, method 400 may determine that the control module has lost communication with the vehicle network.

In this way, communication from the plurality of modules in the vehicle network may be monitored and loss of communication from the modules may be detected.

Figure 5:
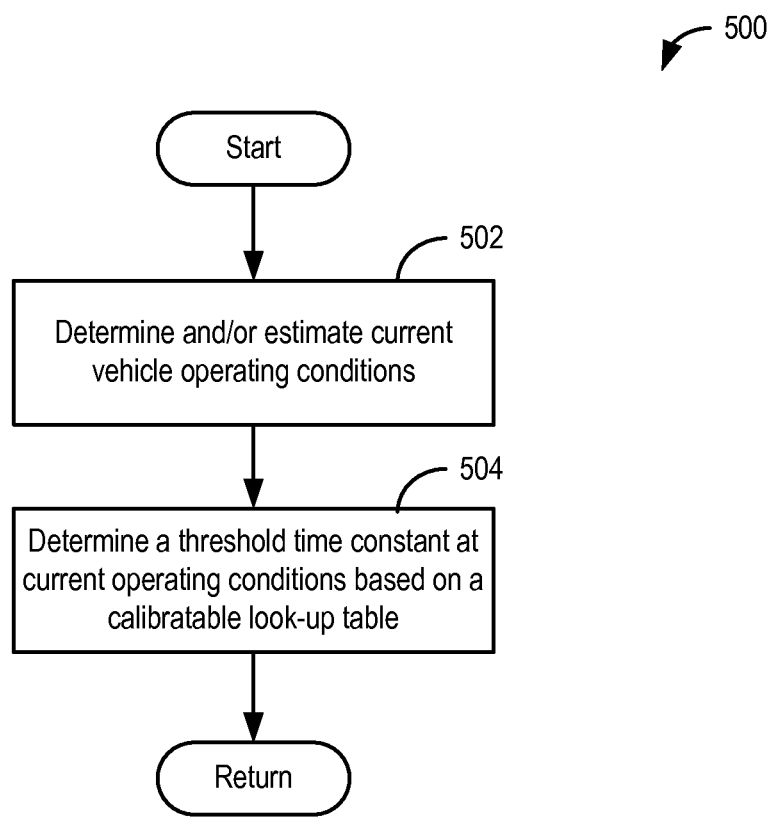
FIG. 5 is a high level flow chart illustrating an example method for determining a threshold time constant.
Figure 6:
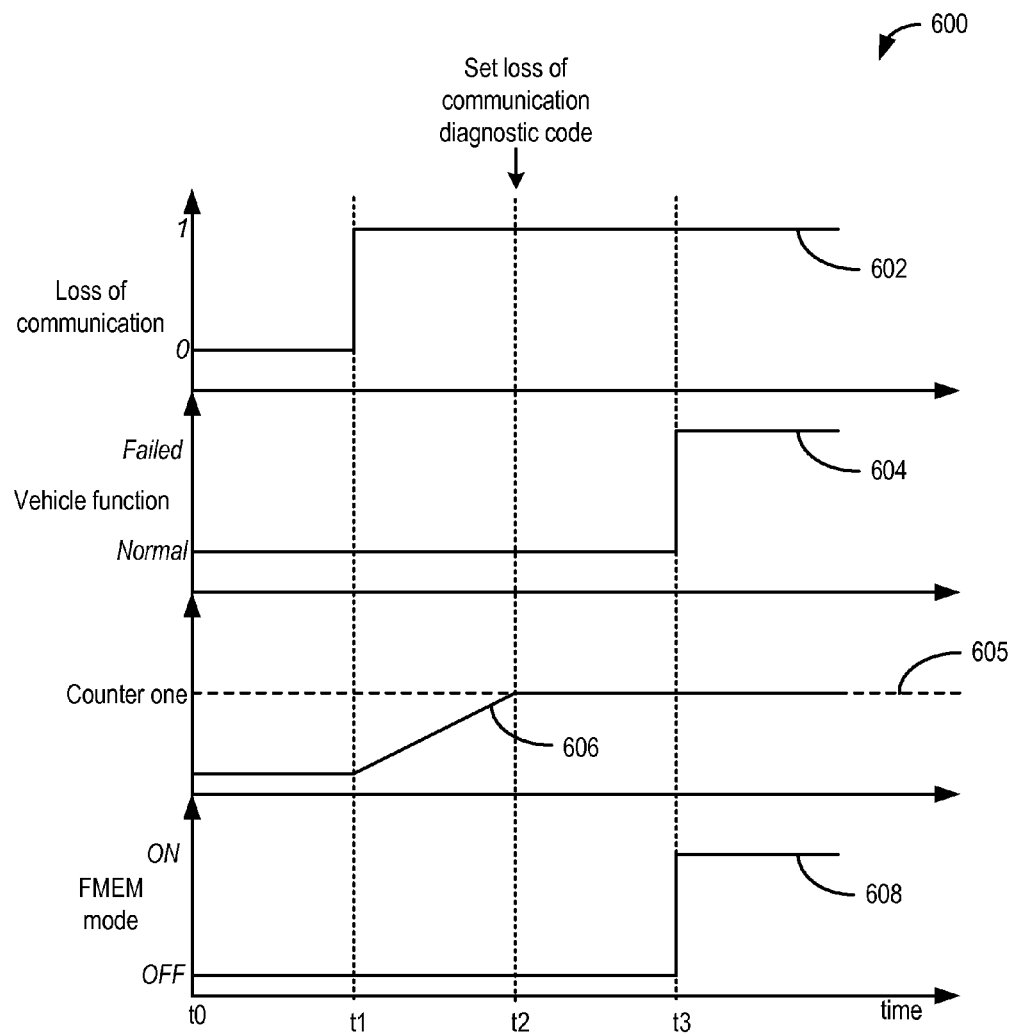
FIG. 6 shows an example setting of the loss of communication diagnostic time code according to the present disclosure.

Turning to FIG. 5, a method 500 for determining a diagnostic time threshold is shown. The diagnostic time threshold may be utilized for setting a loss of communication diagnostic time code. For example, in response to detecting loss of communication from a control module linked to a vehicle network for a duration greater than the diagnostic time threshold, the loss of communication DTC may be set. In other words, intelligent decisions for setting loss of communication DTCs may be based on the diagnostic time threshold. The method of FIG. 5 may be stored as executable instructions in non-transitory memory of a controller (e.g. controller 112 shown in FIG. 1) and carried out by the controller in combination with the various sensors, actuators, engine and vehicle components illustrated in FIGS. 1-2.

At 502, method 500 includes estimating and/or measuring vehicle operating conditions. The vehicle operating conditions may include, for example, engine speed (Ns), vehicle speed (Vs), torque demand, boost pressure, MAP, MAF, engine temperature, combustion air-fuel ratio (AFR), exhaust catalyst temperature, ambient conditions (e.g., BP), etc.

Next, at 504, method 500 includes determining the diagnostic time threshold for setting a loss of communication DTC under current vehicle operating conditions based on a calibratable look-up table. The calibratable look-up table may be generated based on current operating conditions, and further based on an estimated duration for failure of vehicle operation or operator perceivable degradation of vehicle performance to occur due to the loss of communication. That is, the diagnostic time threshold may be based on the estimated duration for failure and/or vehicle performance degradation to occur under current operating conditions due to loss of communication from the module. The estimated duration of failure and/or duration for vehicle performance degradation may be based on one or more of a vehicle speed, a vehicle load condition, barometric pressure, and an operating condition of one or more vehicle components communicating with the module (at which the loss of communication is detected) at a time of detecting the loss of communication. In one example, the diagnostic time threshold may be less than the duration for failure due to loss of communication.

In one example, when communication from a fuel pump electronics control module (PEM) is lost, the diagnostic time threshold for loss of communication from the PEM may be based on an estimated duration of engine operation before the vehicle stalls due to lack of fuel (and hence, lack of torque) under current vehicle operating conditions. For example, the estimated duration for failure (that is, duration before stalling) under high load operating conditions (e.g. vehicle operation on an expressway, during towing heavy loads, etc.) may be shorter than the estimated duration for failure under light load operating conditions. Consequently, the diagnostic time threshold for loss of communication DTC for PEM under high load operating conditions may be shorter than the diagnostic time threshold for loss of communication DTC for PEM under light load operating conditions. For example, in response to loss of communication from the PEM, if the estimated duration for failure (that is, the estimated duration for stalling) is three seconds at seventy miles per hour, the diagnostic time threshold may be less than three seconds. As a result, the loss of communication DTC for the PEM may be set before the vehicle stalls, thereby allowing the PEM loss of communication to be detected.

In another example, the diagnostic time threshold for setting loss of communication DTC for loss of communication from an engine coolant pump control module may be based on an estimated duration for degraded vehicle performance in terms of engine cooling, climate control, and drivability under current vehicle operating conditions.

In this way, by determining the diagnostic time threshold based on an estimated duration for failure due to loss of communication under current vehicle operating conditions, the loss of communication DTC may be set prior to the vehicle failing. By setting the loss of communication DTC prior to the failure of vehicle operation, the cause of vehicle failure (in this case, loss of communication from the control module) may be determined.

FIG. 6 shows operating sequence 600 depicting an example activation of a loss of communication diagnostic code in response to detection of loss of communication from a control module in a vehicle network such as the vehicle network 110 at FIG. 1. FIG. 6 illustrates example pedal position at plot 602, state of vehicle function at plot 604, counter one for setting loss of communication diagnostic trouble code at plot 606, and failure mode at plot 608. The sequence of events in FIG. 6 may be provided by executing instructions in the system of FIGS. 1-2 according to the method of FIG. 3-5. Vertical markers at times t0-t3 represent times of interest during the sequence. In all the plots discussed below, the X axis represents time and time increases from the left side of each plot to the right side of each plot.

The first plot from the top of FIG. 6 represents loss of communication versus time. The Y axis represents loss of communication. Level zero represents absence of detected loss of communication and level one represents presence of detected loss of communication.

The second plot from the top of FIG. 6 represents a state of vehicle function versus time. The Y axis represents a failed or a normal state of vehicle function.

The third plot from the top of FIG. 6 represents a value of a first counter one versus time. The Y axis represents the value of the counter one and the value increases in the direction of the Y axis arrow. Horizontal line 605 represents a diagnostic time threshold for setting a loss of communication diagnostic trouble code for the control module. The diagnostic time threshold may be based on current vehicle operating conditions, and an estimated duration for failure due to loss of communication from the control module.

The fourth plot from the top of FIG. 6 represents a state of a failure mode of the vehicle versus time. The Y axis represents the state of the failure mode.

At times between t0 and t1, loss of communication from a control module in the vehicle network may not be detected. Accordingly, vehicle may be operating as expected (that is, normal vehicle operation without loss of communication or loss of function), and counter one for setting loss of communication DTC may be at zero.

At t1, a loss of communication from the control module may be detected. In one example, loss of communication may be determined based on absence of one or more expected signal(s) from the control module. In another example, loss of communication may be based on determination of an error state of a diagnostic monitor line linking the control module with the ECM. Details of determining loss of communication is elaborated at FIGS. 4A-4B. Upon detecting the loss of communication from the module, counter one may be started. Further diagnostic time threshold 605 may be adjusted based on an estimated time for failure of vehicle operation or degradation of vehicle operation due to the loss of communication under current operating conditions. For example, if a loss of communication from a PEM is detected and the vehicle is operating under high load conditions, the diagnostic time threshold may be based on an estimated duration for vehicle to stall (due to lack of torque resulting from lack of fuel due to lost communication with PEM) under the high load conditions. If the loss of communication from the PEM is detected when the vehicle is operating under low load conditions, the diagnostic time threshold may be based on an estimated duration for vehicle to stall (due to lack of torque resulting from lack of fuel due to lost communication with PEM) under the low load conditions. As such, the diagnostic time threshold may be less than the estimated duration for vehicle failure due to loss of communication so as to set the loss of communication DTC prior to occurrence of vehicle failure due to the loss of communication from the module.

At times between t1 and t2, the communication from the PEM may not be restored and consequently, counter one may continue to increase. At t2, the counter may reach the diagnostic time threshold for activating the loss of communication DTC. Upon counter one reaching the diagnostic time threshold, the DTC for loss of communication may be activated. For example, in response to a counter for loss of communication from a PEM reaching a PEM diagnostic threshold under current operating conditions, the loss of communication DTC for PEM (e.g. U0109) may be activated. Similarly, in response to a counter for loss of communication from a cruise control module (ICCM) reaching an ICCM diagnostic threshold under current operating conditions, the loss of communication DTC for ICCM (e.g. U0104) may be activated.

At t3, vehicle may enter a state of failure due to loss of communication from the module. Consequently, the DTC for failed vehicle function may be activated and the vehicle may be operated in a failure mode. For example, due to loss of communication from the PEM, a difference between a demanded torque and an actual torque may be greater than a threshold torque difference. As a result, DTC related to loss of torque may be activated. While the above example illustrates entering a failure mode in response to detecting a vehicle function failure, in some examples, the vehicle may be operated in the failure mode upon activating the loss of communication DTC. That is, vehicle may be operated in the failure mode at t2 instead of t3.

In this way, vehicle systems may be equipped with intelligent loss of communication detection feature wherein a threshold for activating loss of communication DTC is determined based on an estimated duration for failure due to loss of communication under current operating conditions such that the loss of communication DTC is set prior to the vehicle entering a failure mode of operation. As a result, vehicle loss of communication diagnostics may be improved. In one example, a method for loss of communication in a control system of a vehicle may comprise: in response to determining a loss of communication from a first module coupled to a controller area network of the control system, starting a first counter; and setting a loss of communication diagnostic time code in response to the first counter exceeding a first diagnostic time threshold; and wherein, the first diagnostic time threshold is less than an estimated duration for occurrence of a failure due to the loss of communication.

The method includes wherein the estimated duration for failure is an output of a calibratable look up table utilizing as inputs one or more of a vehicle speed, a desired load, a barometric pressure, an ambient temperature, and an operating condition of one or more vehicle components communicating with the first module at a time of determination of the loss of communication. In some examples, the method includes wherein the loss of communication is determined based on not detecting one or more signals in a monitor line between the first module and an engine control module for a second time threshold.

Further, the method comprises operating the vehicle in a failure mode in response to setting the loss of communication diagnostic code. Still further, the method includes wherein the first module is a pump electronic module (PEM); and wherein the PEM regulates operation of a fuel pump located in a fuel tank of the vehicle, and wherein the failure is a difference between a desired torque output and a current torque output greater than a threshold torque output.

Further, the method includes operating the vehicle in a failure mode in response to detecting loss of communication from the PEM.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system comprising:
a plurality of electronic control modules regulating a plurality of vehicle operations, each of the plurality of electronic control modules communicating with a controller area network bus of a vehicle control system;
a monitor line communicating diagnostic data between a first control module and an electronic control module of the plurality of electronic control modules; and
a controller with computer readable instructions stored in non-transitory memory for:
detecting a loss of communication from the first module based on detecting an error state of the monitor line;
in response to detecting the loss of communication, adjusting a first time constant to a duration less than an estimated time for vehicle failure to occur due to the loss of communication from the first module, and starting a counter; and
in response to the counter exceeding the first time constant, setting a loss of communication diagnostic time code.

2. The system of claim 1, wherein the estimated time is based on one or more of a vehicle speed, a vehicle load, a barometric pressure, and an operating condition of the first module.

3. The system of claim 2, wherein the controller includes further instructions for shifting vehicle operation to a failure mode in response to setting the loss of communication diagnostic time code, wherein the counter is started in response to detecting the loss of communication from the first module via the monitor line, and wherein the estimated time is shorter when the vehicle load is higher, and the estimated time is longer when the vehicle load is lower.

4. A vehicle system, comprising:
a plurality of electronic control modules coupled to a controller area network bus within a vehicle, each of the plurality of electronic control modules configured to receive input from one or more sensors within the vehicle and adjust one or more actuators within the vehicle based on the received input; and
a controller with computer readable instructions stored in non-transitory memory for:
in response to detecting a loss of communication from at least one electronic control module of the plurality of electronic control modules, determining a first time threshold for setting a loss of communication diagnostic trouble code, the first time threshold being a duration less than an estimated duration for loss of vehicle operation due to the loss of communication, and starting a counter; and
in response to the counter exceeding the first time threshold, setting the loss of communication diagnostic trouble code.

5. The system of claim 4, wherein the first time threshold is less than the estimated duration for loss of vehicle operation, and wherein the estimated duration is based on a vehicle speed.

6. The system of claim 5, wherein the estimated duration for loss of vehicle operation is based on one or more of the vehicle speed, a vehicle load condition, an ambient temperature, a vehicle soak duration, a vehicle ON duration, engine coolant temperature, a vehicle current location, an engine speed, torque demand, high voltage state of charge, barometric pressure, and an operating condition of one or more vehicle components communicating with the at least one electronic control module at a time of detecting the loss of communication.

7. The system of claim 4, wherein detecting the loss of communication includes not detecting one or more expected signals from the at least one electronic control module via the network bus, and wherein the estimated duration is based on an operating parameter of the at least one electronic control module.

8. The system of claim 4, wherein the controller is within an engine control module (ECM) of the vehicle, wherein detecting the loss of communication includes determining an error state of a monitor line communicating data between the at least one electronic control module and the ECM, and wherein the estimated duration is based on vehicle load.

9. The system of claim 8, wherein the error state is determined based on the ECM not receiving data from the at least one electronic control module via the monitor line, and wherein the estimated duration is higher when the vehicle load is lower and the estimated duration is lower when the vehicle load is higher.

10. The system of claim 4, wherein the controller includes further instructions for:
operating the vehicle in a failure mode in response to detecting the loss of vehicle operation due to the loss of communication.

11. The system of claim 10, wherein the loss of communication diagnostic trouble code is set prior to entering the failure mode.

12. The system of claim 4, wherein the at least one electronic control module is a pump electronic control module, the pump electronic control module regulating operation of a fuel pump located within a fuel tank of the vehicle, wherein the loss of vehicle operation is a difference between a desired torque output and a current torque output greater than a threshold torque output, wherein the estimated duration is an estimated duration of engine operation before a stall event due to lack of fuel under current vehicle operating conditions, and wherein the estimated duration is based on vehicle load, the estimated duration being higher when the vehicle load is lower and the estimated duration being lower when the vehicle load is higher, the estimated duration further based on vehicle speed.

13. The system of claim 7, wherein the controller includes further instructions for:
in response to receiving the one or more expected signals before the counter exceeds the first time threshold, stopping the counter and not setting the loss of communication diagnostic trouble code.

* * * * *